(12) United States Patent
Xue et al.

(10) Patent No.: US 10,531,225 B2
(45) Date of Patent: Jan. 7, 2020

(54) METHOD AND APPARATUS FOR VERIFYING ENTITY INFORMATION

(71) Applicant: Alibaba Group Holding Limited, George Town (KY)

(72) Inventors: Kejing Xue, Hangzhou (CN); Pengzhi Wu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/440,868

(22) Filed: Jun. 13, 2019

(65) Prior Publication Data

US 2019/0313203 A1 Oct. 10, 2019

Related U.S. Application Data

(63) Continuation of application No. PCT/CN2017/114434, filed on Dec. 4, 2017.

(30) Foreign Application Priority Data

Dec. 14, 2016 (CN) .......................... 2016 1 1152681

(51) Int. Cl.
*H04W 4/021* (2018.01)
*G06K 9/00* (2006.01)
*H04W 4/029* (2018.01)

(52) U.S. Cl.
CPC ........ *H04W 4/021* (2013.01); *G06K 9/00684* (2013.01); *H04W 4/029* (2018.02)

(58) Field of Classification Search
CPC ... H04W 4/021; H04W 4/029; G06K 9/00684
See application file for complete search history.

(56) References Cited

U.S. PATENT DOCUMENTS 5,774,525 A 6/1998 Kanevsky et al.
7,174,462 B2 * 2/2007 Pering ..................... G06F 21/36
                                                   713/168
(Continued)

FOREIGN PATENT DOCUMENTS

CN 102687141 9/2012
CN 105323073 2/2016
(Continued)

OTHER PUBLICATIONS

PCT International Preliminary Report on Patentability in International Application No. PCT/CN2017/114434, dated Jun. 18, 2019, 9 pages (with English translation).
(Continued)

*Primary Examiner* — Mazda Sabouri
(74) *Attorney, Agent, or Firm* — Fish & Richardson P.C.

(57) ABSTRACT

This specification describes techniques for verifying location information. One example method includes identifying location information associated with a particular entity; determining, based on the location information, a candidate entity set including a plurality of candidate entities, wherein each candidate entity is different than the particular entity, and wherein the candidate entity set includes a correct set including candidate entities that satisfy candidate location criteria; sending the candidate entity set and the candidate location criteria to the particular entity; receiving a selected entity set including one or more of the candidate entities; determining that the selected entity set includes a number of candidate entities from the correct set satisfies a location verification threshold; and in response determining that the selected entity set includes the number of candidate entities from the correct set that exceeds the location verification threshold, determining that the location information of the particular entity is verified.

20 Claims, 8 Drawing Sheets

(56) References Cited

U.S. PATENT DOCUMENTS

| | | | | |
|---|---|---|---|---|
| 8,200,247 | B1* | 6/2012 | Starenky | G01C 21/28 |
| | | | | 455/456.3 |
| 2010/0026526 | A1* | 2/2010 | Yokota | G08G 1/096827 |
| | | | | 340/996 |
| 2011/0313779 | A1* | 12/2011 | Herzog | G06Q 10/10 |
| | | | | 705/1.1 |
| 2014/0195320 | A1* | 7/2014 | Busch | H04W 4/029 |
| | | | | 705/14.25 |
| 2014/0253376 | A1* | 9/2014 | Large | G01S 19/21 |
| | | | | 342/357.59 |
| 2014/0274122 | A1* | 9/2014 | Tseng | G01S 19/14 |
| | | | | 455/456.1 |
| 2017/0046891 | A1* | 2/2017 | Trivelpiece | G07C 9/00111 |
| 2017/0134372 | A1* | 5/2017 | Dube | H04L 63/0823 |
| 2018/0302414 | A1* | 10/2018 | Wagner | H04L 63/107 |
| 2019/0156009 | A1* | 5/2019 | Maresh | G06F 21/36 |

FOREIGN PATENT DOCUMENTS

| | | |
|---|---|---|
| CN | 107038589 | 8/2017 |
| WO | WO 2015165071 | 11/2015 |

OTHER PUBLICATIONS

PCT International Search Report and Written Opinion in International Application No. PCT/CN2017/114434. dated Feb. 24, 2018. 14 pages (with English translation).

Extended European Search Report in European Application No. 17881231.9, dated Nov. 25, 2019, 9 pages.

\* cited by examiner

METHOD AND APPARATUS FOR VERIFYING ENTITY INFORMATION

CROSS-REFERENCE TO RELATED APPLICATIONS

This application is a continuation of PCT Application No. PCT/CN2017/114434, filed on Dec. 4, 2017, which claims priority to Chinese Patent Application No. 201611152681.9, filed on Dec. 14, 2016, and each application is hereby incorporated by reference in its entirety.

TECHNICAL FIELD

The present application relates to the field of computer technologies, and in particular, to a method and apparatus for verifying entity information.

BACKGROUND

With the development of the Internet, increasingly more services can be implemented by using the Internet, for example, electronic commerce, social networking, or even banking services. In view of authenticity and security, users usually need to upload some entity information for entity verification. For example, the entity information can include location information, name information, real scene images, etc. For example, verify entity information of a physical store that is provided by a merchant, and verify entity information of a company that is provided by a user.

In the existing technology, location information and real scene images in entity information are usually verified through human review, for example, manually review location information and store images of a physical store that are provided by a merchant. For another example, manually review location information and company images of a company that are provided by a user.

However, in the real world, location information and real scene images are complex and variable, authenticity of location information and real scene images of each entity cannot be verified one by one through human review, and verification can only be subjectively performed based on experience. In addition, forgery of location information and real scene images is very simple, which causes great interference to human review. Therefore, the solution in the existing technology that entity information is verified through human review based on a combination of location information and real scene images is characterized by very low accuracy. In addition, human review is limited by working hours and manpower, and it is difficult to continuously guarantee timeliness.

SUMMARY

An implementation of the present application provides a method for verifying entity information, to improve accuracy of verifying entity information.

An implementation of the present application provides an apparatus for verifying entity information, to improve accuracy of verifying entity information.

The following technical solutions are used in implementations of the present application.

The method for verifying entity information includes: determining location information in entity information sent by a user; determining, based on the location information, a candidate entity set whose location relationship with the entity satisfies a predetermined condition, where the candidate entity set does not include the entity; and verifying the entity information based on a result of determining, by the user, candidate entity information corresponding to the candidate entity set under a predetermined verification condition.

The apparatus for verifying entity information includes a first determining unit, a second determining unit, and a verification unit, where the first determining unit is configured to determine location information in entity information sent by a user; the second determining unit is configured to determine, based on the location information, a candidate entity set whose location relationship with the entity satisfies a predetermined condition, where the candidate entity set does not include the entity; and the verification unit is configured to verify the entity information based on a result of determining, by the user, candidate entity information corresponding to the candidate entity set under a predetermined verification condition.

The at least one technical solution used in the implementations of the present application can achieve the following beneficial effects: The candidate entity set whose location relationship with the entity satisfies the predetermined condition and that does not include the entity is determined based on the location information in the entity information sent by the user, and verification is performed based on the result of determining, by the user, the candidate entity information corresponding to the candidate entity set under the predetermined verification condition. For a problem in the existing technology that verification accuracy is relatively low because authenticity of entity information is subjectively determined through human review, in the present solution, the entity is bypassed, and authenticity of the entity is objectively verified based on user's knowledge of an environment around the entity, thereby improving verification accuracy. In addition, by using the present solution, human review interventions can be reduced or even avoided, thereby improving timeliness of a verification process.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Implementation 1

Figure 1:
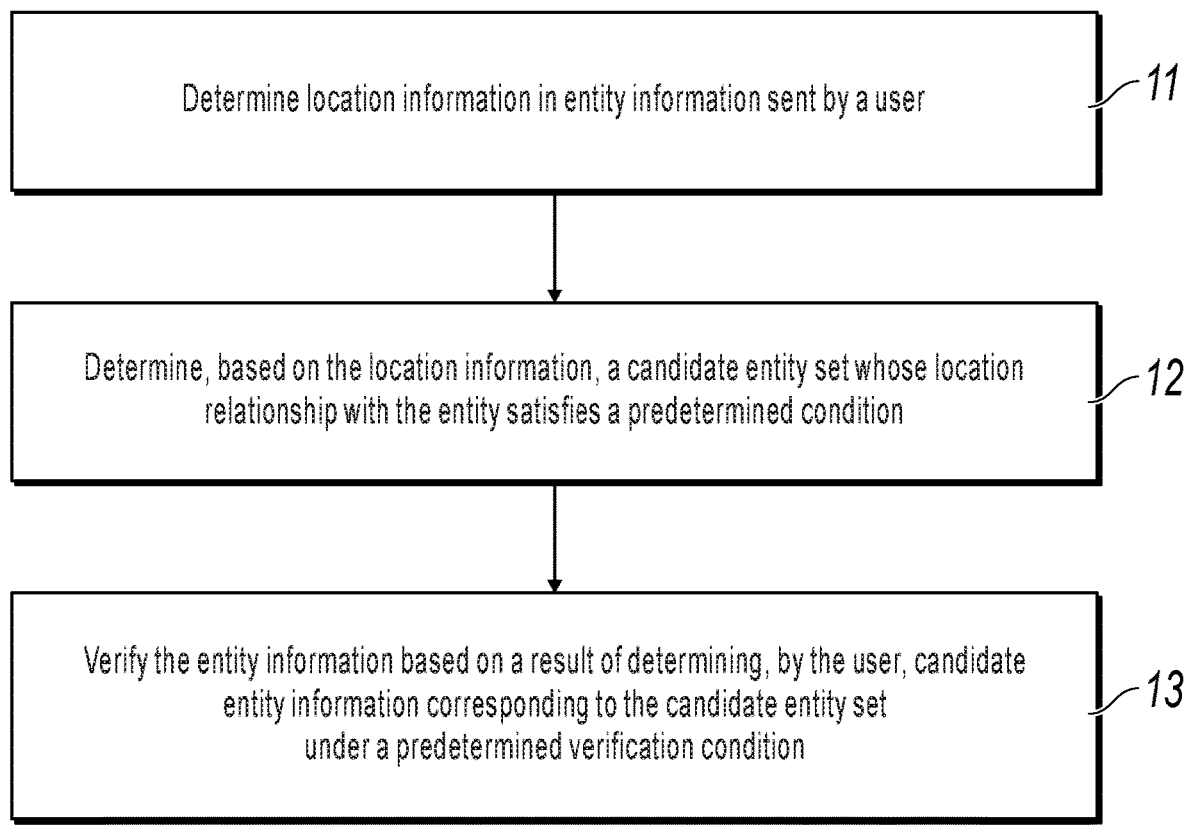
FIG. 1 is a schematic flowchart illustrating a method for verifying entity information, according to Implementation 1 of the present application.

As described above, in the existing technology, location information and real scene images in entity information are usually verified through human review. For example, a merchant provides location information (e.g., "No. XX XX street") of a physical store and store images (e.g., facade photos of the store, and photos of decoration and layout in the store). It's impossible for reviewers to verify each piece of entity information on the spot. Most of the reviewers subjectively determine authenticity of the information based on experience, and there is no standard to determine authenticity. In addition, with the development of computer software, forgery of location information and real scene images is very simple. Therefore, based on the previous description, accuracy of human review is very low. In addition, human review is limited by working hours and manpower, and it is difficult to guarantee timeliness. Based on the previous defects, an implementation of the present application provides a method for verifying entity information, to improve accuracy of verifying entity information. As shown in FIG. 1, the method includes the following steps:

Step 11: Determine location information in entity information sent by a user.

The entity can be a real object in reality. For example, verification of the entity information in the present application is actually determining whether the entity really exists in reality. In an Internet service, during verification of entity information, whether a physical store of a merchant really exists can be verified, and whether a working place of a user really exists can be verified. Therefore, the entity mentioned here can be a physical store, a working place, etc.

As described above, the entity information can include location information, name information, real scene images, etc. For example, for a physical store, the location information can be a geographic location, the name information can be a name of the store, and the real scene images can be facade photos of the store, photos of decoration and layout in the store, etc.

When the entity information sent by the user needs to be verified, the entity information sent by the user can be received, and the location information in the entity information is determined, for example, No. XX XX street. In practice, coordinate information (e.g., "Nxxxx, Exxxx") sent by a user by using a terminal device can also be received. Specifically, the coordinate information can be sent by using a Global Positioning System (GPS), a BeiDou Navigation Satellite System, etc.

For ease of description, the entity in the present implementation can be referred to as an entity that is to be verified, to be specific, an entity that is not successfully verified.

Step 12: Determine, based on the location information, a candidate entity set whose location relationship with the entity satisfies a predetermined condition.

In the existing technology, entity information of an entity that is to be verified is directly verified. Because whether the entity that is to be verified exists cannot be determined, it is difficult to determine authenticity of the entity that is to be verified if verification is not performed on the spot. However, through study, the inventor finds that the entity is relatively fixed, for example, a geographic location of a physical store, a geographic location of a working place, and a geographic location of a public place, and a probability of frequent migration is very small. Therefore, if the entity really exists, a merchant (user) is not only familiar with the entity in which the merchant (user) is located, but also familiar with a nearby entity. Therefore, when authenticity of the entity that is to be verified cannot be determined, the information about the entity that is to be verified can be verified by using the entity near the entity that is to be verified. However, the merchant (the user) is relatively familiar with the nearby entity, but is unfamiliar with an entity that is far away from the entity that is to be verified. Therefore, the information about the entity that is to be verified can also be verified by using the entity that is far away from the entity that is to be verified.

Therefore, based on the previous analysis, in the present step, an entity that has a specific relationship with a location of the entity that is to be verified can be determined based on the location information of the entity that is to be verified, and verification is performed based on user's knowledge of these entities. To be specific, in the present step, the candidate entity set whose location relationship with the entity satisfies the predetermined condition can be determined. A specific predetermined condition can be that a candidate entity is close to the entity that is to be verified (where a proximity condition is satisfied), or a candidate entity is far away from the entity that is to be verified (where a non-proximity condition is satisfied). Whether the proximity condition is satisfied can be filtered by using a predetermined distance threshold. Whether the non-proximity condition is satisfied can be filtered by using a predetermined distance threshold, and also can be filtered based on area division at a geographic location. For example, if the predetermined condition is "less than 200 meters", in the present step, an entity whose distance from the entity that is to be verified is less than 200 meters can be identified based on the location information of the entity that is to be verified, and the entity is determined as a candidate entity set. In practice, because determining a large quantity of entities is of little meaning, a quantity such as three or four can be usually predetermined. For example, three entities are selected from all entities that satisfy a predetermined condition to form a candidate entity set.

As described above, the information about the entity that is to be verified can be verified by using the entity near the entity that is to be verified, and also can be verified by using the entity far away from the entity that is to be verified. In an implementation, the present step can include the following: determining, based on the location information, a first entity set whose location relationship with the entity satisfies the proximity condition, and/or determining, based on the location information, a second entity set whose location relationship with the entity satisfies the non-proximity condition; and determining the first entity set and/or the second entity set as the candidate entity set. That is, the candidate entity set can include only an entity that is close to the entity that is to be verified, or can include only an entity that is far away from the entity that is to be verified, or can include both an entity that is close to the entity that is to be verified and an entity that is far away from the entity that is to be verified. Considering that the user is more familiar with an environment near the entity than an environment far away from the entity, verification performed on the entity by using the first entity set whose location relationship with the entity satisfies the proximity condition is more effective. Therefore, in an implementation, the candidate entity set includes at least the first entity set.

As mentioned above, the information about the entity that is to be verified can be verified by using the entity near the entity that is to be verified. Therefore, when determining the candidate entity set whose location relationship with the entity satisfies the predetermined condition in the present step, the candidate entity set may not include the entity that is to be verified.

It is worthwhile to note that in the present step, a determined candidate entity needs to have relatively high authenticity, for example, the determined candidate entity can be a well-known entity (e.g., a large shopping mall, a shopping center, or a chain's physical store). That is to say, authenticity of the candidate entity indirectly determines, to some extent, authenticity of the information about the entity that is to be verified.

Step 13: Verify the entity information based on a result of determining, by the user, candidate entity information corresponding to the candidate entity set under a predetermined verification condition.

In the previous step, the candidate entity set is determined, and the set does not include the entity that is to be verified. Therefore, in this case, the candidate entity information corresponding to the candidate entity set can be provided for the user, and the predetermined verification condition is also provided for the user. The information about the entity that is to be verified is verified based on the result of determining, by the user, the candidate entity information under the predetermined verification condition.

For example, the candidate entity set determined in step 12 includes three entities that satisfy the proximity condition and five entities that satisfy the non-proximity condition. Candidate entity information corresponding to the eight candidate entities can be sent to the user together (or one by one), together with a verification condition of "selecting a nearby entity". Afterwards, a result of a candidate entity selection performed by the user can be obtained. If three entities selected by the user are the same as the three entities that satisfy the proximity condition, the verification succeeds. Alternatively, the candidate entity information corresponding to the eight candidate entities can be sent to the user one by one, together with a verification condition of "selecting a farther entity". Afterwards, a result of determining by the user for a candidate entity can be obtained. If "farther entities" determined by the user are the same as any three of the five entities that satisfy the non-proximity condition (in other words, a correctness percentage exceeds 50%), the verification succeeds.

According to the method provided in Implementation 1, the candidate entity set whose location relationship with the entity satisfies the predetermined condition and that does not include the entity is determined based on the location information in the entity information sent by the user, and the entity is verified based on the result of determining, by the user, the candidate entity information corresponding to the candidate entity set under the predetermined verification condition. For a problem in the existing technology that verification accuracy is relatively low because authenticity of entity information is subjectively determined through human review, in the present solution, the entity is bypassed, and authenticity of the entity is objectively verified based on user's knowledge of an environment around the entity, thereby improving verification accuracy. In addition, by using the present solution, human review interventions can be reduced or even avoided, thereby improving timeliness of a verification process.

Implementation 2

Figure 2:
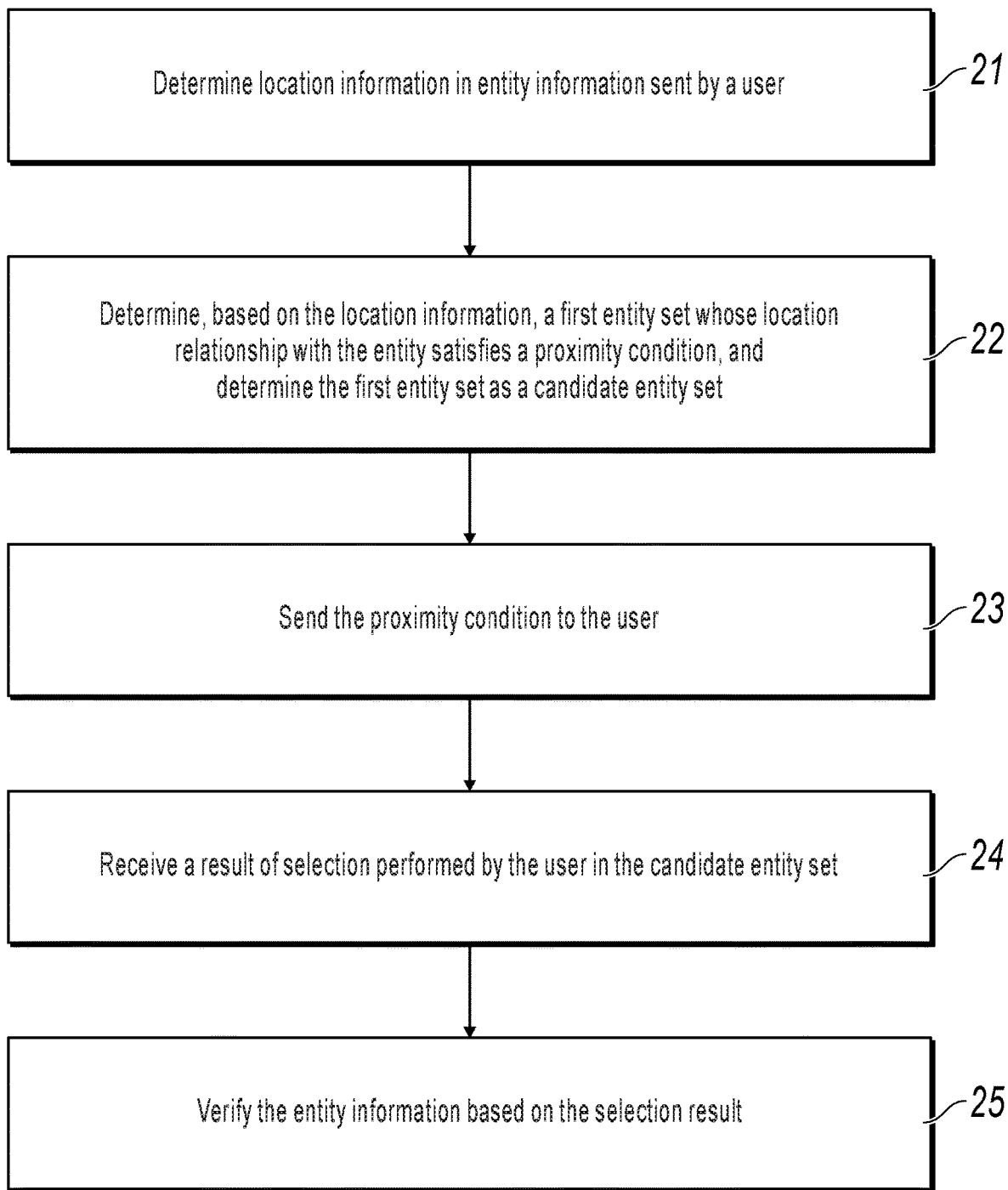
FIG. 2 is a schematic flowchart illustrating a method for verifying entity information, according to Implementation 2 of the present application.

Based on the same inventive concept as Implementation 1, the present application is described in more detail here, to provide a method for verifying entity information in an implementation of the present application, so as to improve accuracy of verifying entity information. As shown in FIG. 2, the method includes the following steps:

Step 21: Determine location information in entity information sent by a user.

The present step is similar to step 11 in Implementation 1. Details are omitted for simplicity.

Step 22: Determine, based on the location information, a first entity set whose location relationship with the entity satisfies a proximity condition, and determine the first entity set as a candidate entity set.

In description of step 12 in Implementation 1, it has been mentioned that, considering that the user is more familiar with an environment near the entity (that is to be verified) than an environment far away from the entity, verification performed on the entity by using the first entity set whose location relationship with the entity satisfies the proximity condition is more effective. Therefore, in the present step, the first entity set whose location relationship with the entity satisfies the proximity condition can be determined based on the location information, and then the first entity set is directly determined as the candidate entity set. To be specific, location relationships between entities in the candidate entity set and the entity that is to be verified all satisfy the proximity condition, in other words, the candidate entities are all near the entity that is to be verified. For example, the proximity condition can be set to that an entity is within a circular range in which the location information is a center and a radius is a predetermined first threshold. Specifically, for example, the first threshold can be 200 meters. In this case, the entities in the determined candidate entity set are all within a circular range in which the entity is a center and a radius is 200 meters.

As mentioned in step 12, the determined candidate entity needs to have relatively high authenticity. Therefore, the first entity set (the candidate entity set) in the present step also needs to have relatively high authenticity. A quantity of entities in the candidate entity set can be predetermined, but the candidate entity set needs to have a specific quantity of entities, for example, three entities to eight entities. In practice, if there are less than two first entities that satisfy the proximity condition, human review can be performed, or increase the predetermined first threshold, for example, the first threshold is increased from 200 meters to 500 meters, to satisfy a requirement for the first entity set. The first entity set may not include the entity that is to be verified.

Step 23: Send the proximity condition to the user.

To obtain a result of determining, by the user, each entity in the candidate entity set, a predetermined verification condition can be first provided for the user, for example, the user needs to select nearby entities, and therefore, the proximity condition can be sent to the user. For example, the proximity condition is "within 200 meters".

Step 24: Receive a result of selection performed by the user in the candidate entity set.

In practice, candidate entity information corresponding to the candidate entity set can be sent to the user together with the verification condition in step 23, and a corresponding operation interface is set, so that the user can perform selection, and the result of selection performed by the user in the candidate entity set can be received. For example, if the candidate entity set includes eight candidate entities, candidate entity information corresponding to the eight candidate entities can be presented to the user together or one by one, and a function key for implementing selection or determining one by one is set in an operation interface, to wait to receive a selection result of the user.

In a presentation process, one or more pieces of information in the candidate entity information can be presented. For example, the candidate entity information can include name information of a candidate entity, real scene images of the candidate entity, and trademark information of the candidate entity. In the presentation process, the three pieces of information can be all displayed, or only one piece of information can be displayed, or a combination of any two pieces of information can be displayed.

Step 25: Verify the entity information based on the selection result.

Because all candidate entities are near the entity that is to be verified, the information about the entity that is to be verified can be verified based on the selection result of the user. Specifically, the present step can include the following: matching a candidate entity in the selection result with the first entity set. When a matching degree satisfies a specific condition, the verification succeeds. If the matching degree does not satisfy the specific condition, the verification fails. For example, the specific condition can be that a matching degree is greater than 50%, and the candidate entity set includes eight first entities. If the user can select five (more than five) entities from the eight first entities, the verification succeeds. If the user selects only three entities from the eight first entities, the verification fails, or human review is performed to continue verification.

According to the method provided in Implementation 2, the candidate entity set whose location relationship with the entity satisfies the proximity condition and that does not include the entity is determined based on the location information in the entity information sent by the user, and verification is performed based on the result of determining, by the user, the candidate entity information corresponding to the candidate entity set under the proximity condition. For a problem in the existing technology that verification accuracy is relatively low because authenticity of entity information is subjectively determined through human review, in the present solution, the entity is bypassed, and authenticity of the entity that is to be verified is objectively verified based on user's full knowledge of an environment around the entity by using an entity near the entity that is to be verified, thereby improving verification accuracy.

Implementation 3

Figure 3:
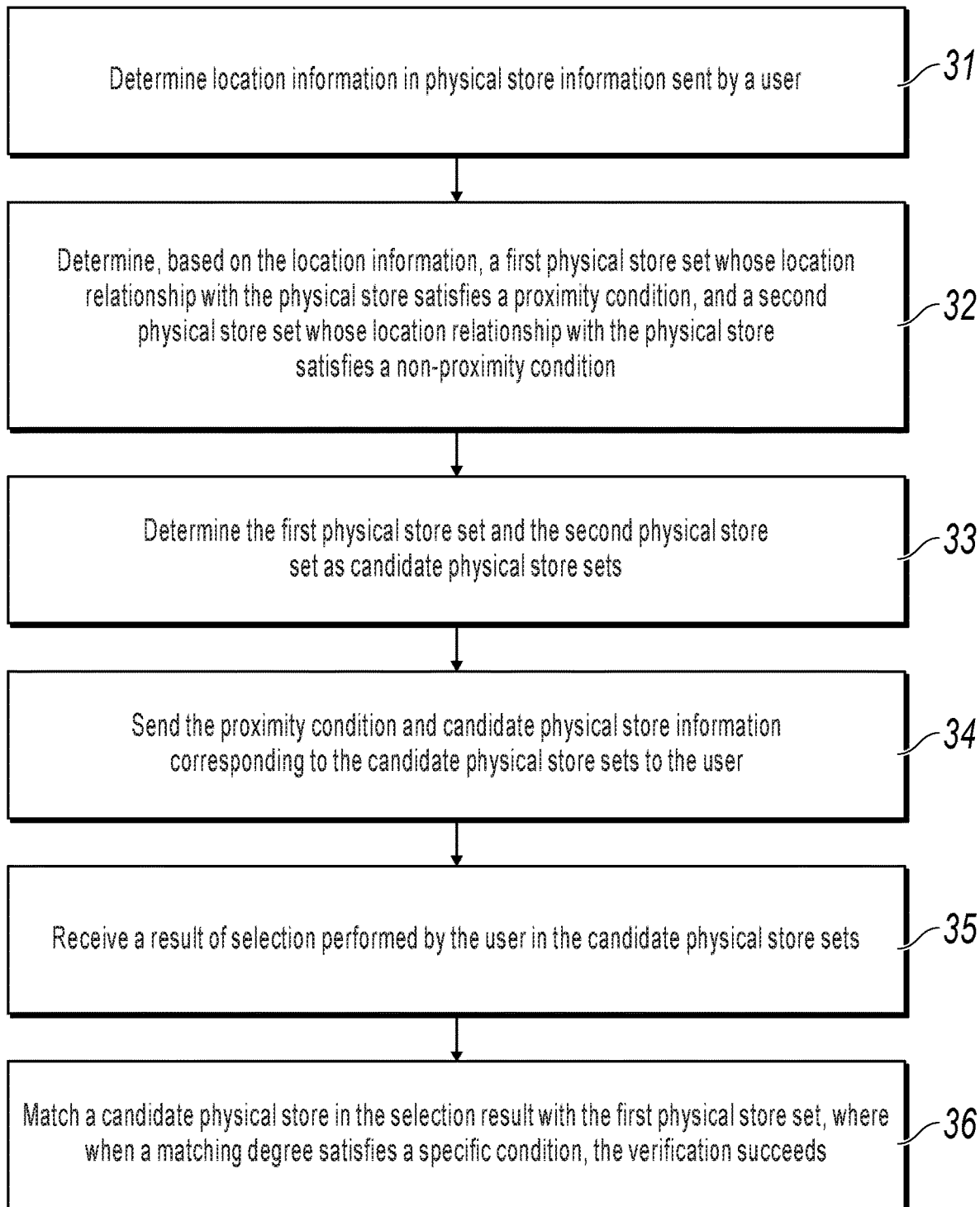
FIG. 3 is a schematic flowchart illustrating a method for verifying a physical store, according to Implementation 3 of the present application.

As described in the background, electronic commerce, social networking, or even banking services can be implemented over the Internet. With the development of economy, especially the development of electronic commerce, a merchant can sell merchandise originally sold in a physical store (offline) by using a virtual store registered on an Internet electronic commerce platform (platform for short) (online), to be specific, online to offline (O2O) means that an offline business opportunity is combined with the Internet, and a physical store is displayed by using a virtual store. The platform usually needs to verify the physical store to determine whether the physical store really exists. However, in the existing technology, location information and real scene images of the physical store are usually verified through human review, so that verification accuracy is relatively low and timeliness is not guaranteed. Therefore, based on the same inventive concept as Implementation 1, Implementation 3 is used as an extension of Implementation 1, An implementation of the present application provides a method for verifying a physical store, to improve accuracy of verifying a physical store. As shown in FIG. 3, the method includes the following steps:

Step 31: Determine location information in physical store information sent by a user.

To register a virtual store on the platform, the user first needs to upload the physical store information for verification. The physical store information can include location information, and can further include name information, real scene images, trademark information, etc. For example, the location information can be coordinates that include a longitude and a latitude.

Step 32: Determine, based on the location information, a first physical store set whose location relationship with the physical store satisfies a proximity condition, and a second physical store set whose location relationship with the physical store satisfies a non-proximity condition.

Figure 4:
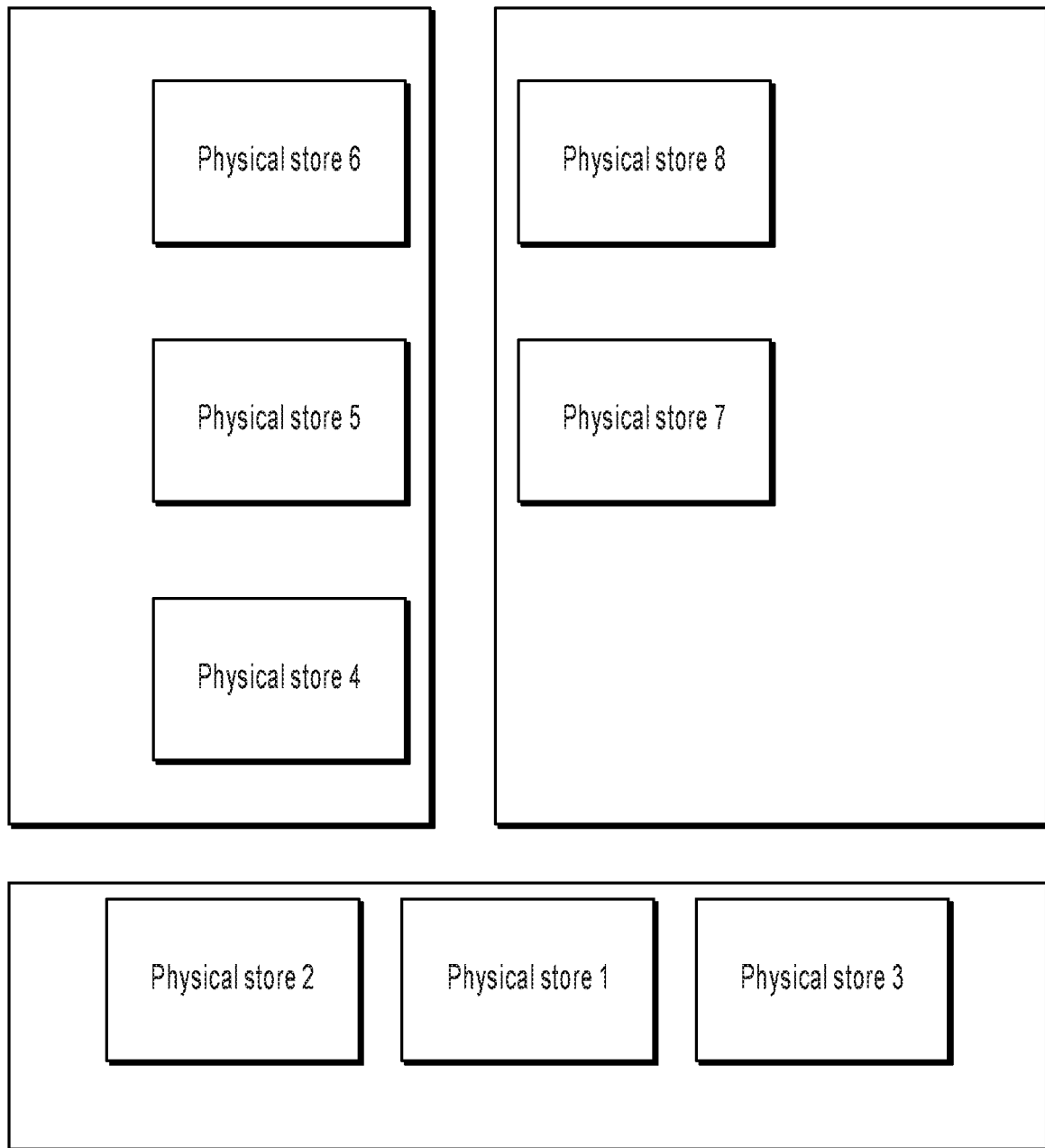
FIG. 4 is a schematic diagram illustrating a geographic location of a physical store, according to Implementation 3 of the present application.
Figure 5:
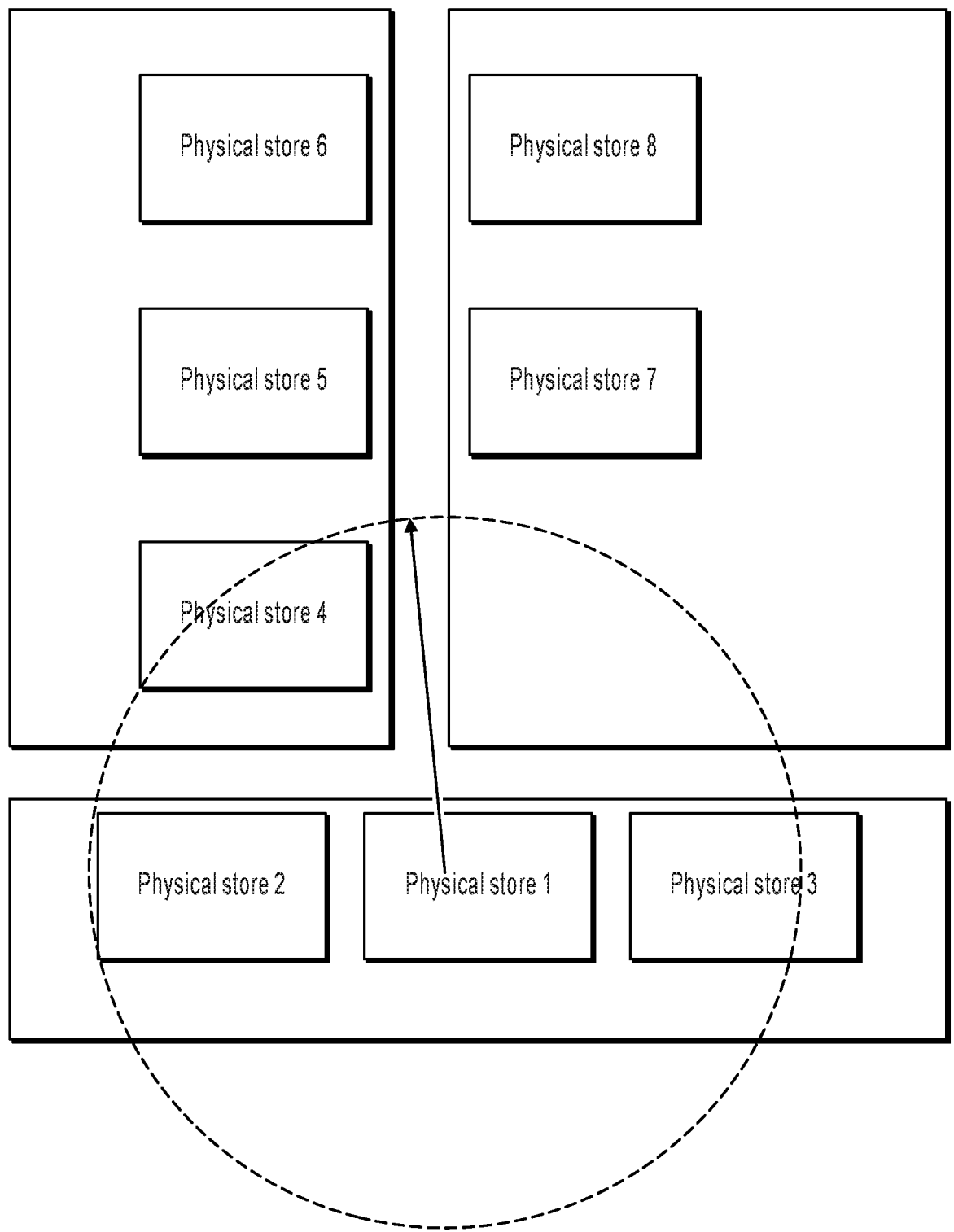
FIG. 5 is a schematic diagram illustrating determining a candidate physical store based on a proximity condition, according to Implementation 3 of the present application.

As shown in FIG. 4, "physical store 1" is the name information of the physical store that is sent by the user, and "physical store 2", "physical store 3", etc. are existing and real physical stores. A location of "physical store 1" in the figure is a location corresponding to the location information (the coordinates including the longitude and the latitude) in the physical store information. The proximity condition is that a physical store is within a circular range in which the location information is a center and a radius is predetermined as 200 meters. For example, as shown in FIG. 5, a dashed-line circle is a circle in which the location of "physical store 1" is a center and a radius is 200 meters. In the dashed-line circular range, there are three physical stores: "physical store 2", "physical store 3", and "physical store 4", and the three physical stores are determined as the first physical store set.

The non-proximity condition is that a physical store is outside a circular range in which the location information is a center and a radius is predetermined as 2000 meters. There are a plurality of physical stores outside the circular range, and three physical stores: "physical store n", "physical store n−1", and "physical store n−2" are selected from the plurality of physical stores and are determined as the second physical store set.

Step 33: Determine the first physical store set and the second physical store set as candidate physical store sets.

In the present step, "physical store 2", "physical store 3", "physical store 4", and "physical store n", "physical store n−1", and "physical store n−2" can be determined as candidate physical store sets.

Step 34: Send the proximity condition and candidate physical store information corresponding to the candidate physical store sets to the user.

In step 32, the proximity condition is that the physical store is within the circular range in which the location information of the physical store that is to be verified is the center and the radius is predetermined as 200 meters. The present step can be shown in FIG. 6, the proximity condition is sent to the user as a verification condition, and it can be set that only three physical stores can be selected. For example, "select three nearby stores" can be sent to the user.

In addition, the candidate physical store information corresponding to the candidate physical store sets such as name information and real scene images of a candidate physical store is sent to the user.

Step 35: Receive a result of selection performed by the user in the candidate physical store sets.

Figure 6:
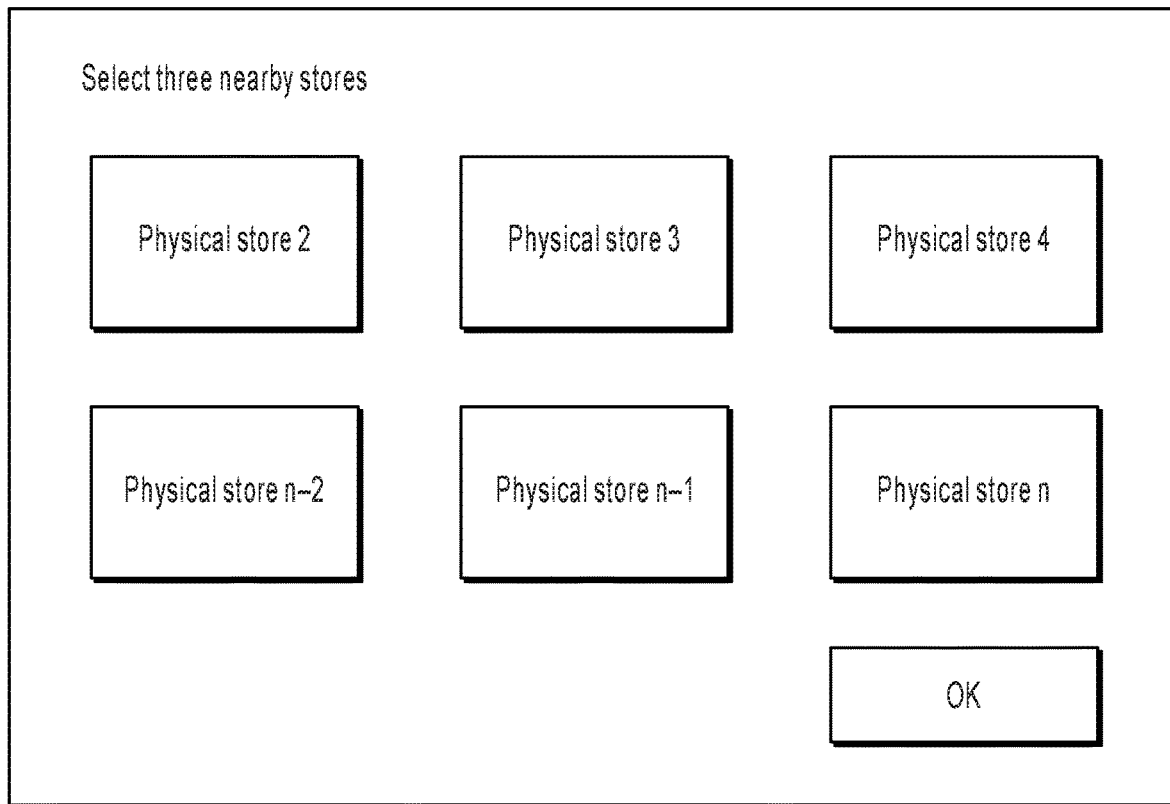
FIG. 6 is a schematic diagram illustrating a selection interface, according to Implementation 3 of the present application.

As shown in FIG. 6, a selection interface is provided for the user, so that the user can perform selection and return a selection result. In the previous step, it can be set that only three physical stores can be selected. Therefore, in the present step, three physical stores selected by the user from the candidate physical store sets can be received.

Step 36: Match a candidate physical store in the selection result with the first physical store set, and when a matching degree satisfies a specific condition, the verification succeeds.

The specific condition is that the matching degree is not less than 50%. Therefore, only when the three physical stores selected by the user are two or three of "physical store 2", "physical store 3", and "physical store 4", verification can succeed.

According to the method provided in Implementation 3, based on the location information in the physical store information that is sent by the user, the first physical store set whose location relationship with the physical store satisfies the proximity condition and that does not include the physical store, and the second physical store set whose location relationship with the physical store satisfies the non-proximity condition are determined, and the two physical store sets are determined as the candidate physical store sets. The physical store is verified based on a result of determining, by the user, the candidate physical store information corresponding to the candidate physical store sets under the proximity condition. For a problem in the existing technology that verification accuracy is relatively low because authenticity of physical store information is subjectively determined through human review, in the present solution, the physical store is bypassed, and authenticity of the physical store is objectively verified based on user's knowledge of an environment around the physical store, thereby improving verification accuracy. In addition, by using the present solution, human review interventions can be reduced or even avoided, thereby improving timeliness of a verification process.

Implementation 4

Figure 7:
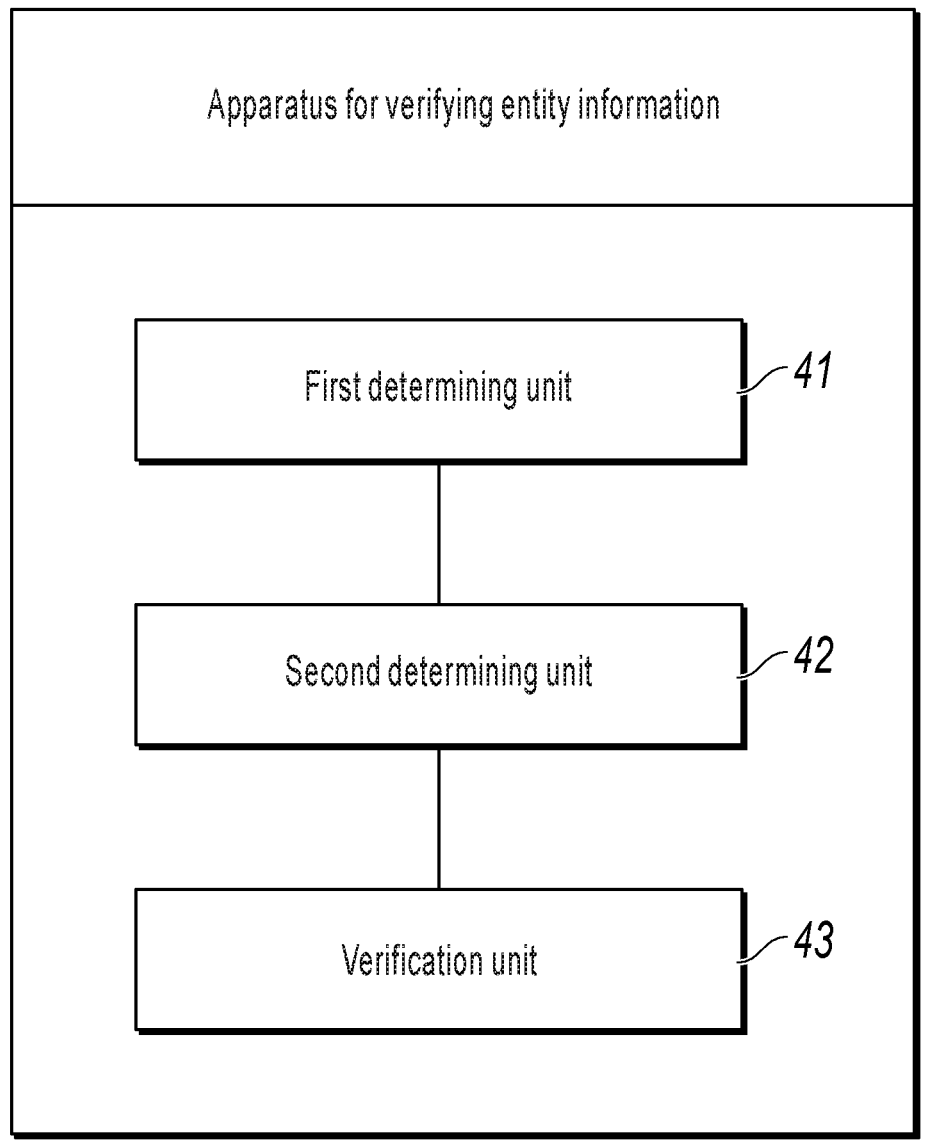
FIG. 7 is a structural diagram of an apparatus for verifying entity information, according to Implementation 4 of the present application.

Based on the same inventive concept, Implementation 4 provides an apparatus for verifying entity information, to improve accuracy of verifying entity information. As shown in FIG. 7, the apparatus includes a first determining unit 41, a second determining unit 42, and a verification unit 43.

The first determining unit 41 can be configured to determine location information in entity information sent by a user.

The second determining unit 42 can be configured to determine, based on the location information, a candidate entity set whose location relationship with the entity satisfies a predetermined condition. The candidate entity set does not include the entity.

The verification unit 43 can be configured to verify the entity information based on a result of determining, by the user, candidate entity information corresponding to the candidate entity set under a predetermined verification condition.

In an implementation, the second determining unit 42 can be configured to determine, based on the location information, a first entity set whose location relationship with the entity satisfies a proximity condition, and/or determine, based on the location information, a second entity set whose location relationship with the entity satisfies a non-proximity condition; and determine the first entity set and/or the second entity set as the candidate entity set.

In an implementation, the candidate entity set includes at least the first entity set, and the predetermined verification condition is the proximity condition, and the verification unit 43 can be configured to send the proximity condition to the user, receive a result of selection performed by the user in the candidate entity set, and verify the entity information based on the selection result.

In an implementation, the verification unit 43 can be configured to match a candidate entity in the selection result with the first entity set, where when a matching degree satisfies a specific condition, the verification succeeds.

In an implementation, the proximity condition includes that an entity is within a circular range in which the location information is a center and a radius is a predetermined first threshold.

In an implementation, the candidate entity information can include at least one of the following: name information of a candidate entity, real scene images of the candidate entity, and trademark information of the candidate entity.

According to the apparatus provided in Implementation 4, the candidate entity set whose location relationship with the entity satisfies the predetermined condition and that does not include the entity is determined based on the location information in the entity information sent by the user, and verification is performed based on the result of determining, by the user, the candidate entity information corresponding to the candidate entity set under the predetermined verification condition. For a problem in the existing technology that verification accuracy is relatively low because authenticity of entity information is subjectively determined through human review, in the present solution, the entity is bypassed, and authenticity of the entity is objectively verified based on user's knowledge of an environment around the entity, thereby improving verification accuracy. In addition, by using the present solution, human review interventions can be reduced or even avoided, thereby improving timeliness of a verification process.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The present application is described with reference to the flowcharts and/or block diagrams of the method, the device (system), and the computer program product according to the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device or any other non-transmission medium. The computer storage medium can be used to store information that can be accessed by a computing device. As described in the present specification, the computer readable medium does not include computer readable transitory media (transitory media) such as a modulated data signal and a carrier.

It is worthwhile to further note that, the terms "include", "comprise", or their any other variants are intended to cover a non-exclusive inclusion, so that a process, a method, a product or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 8:
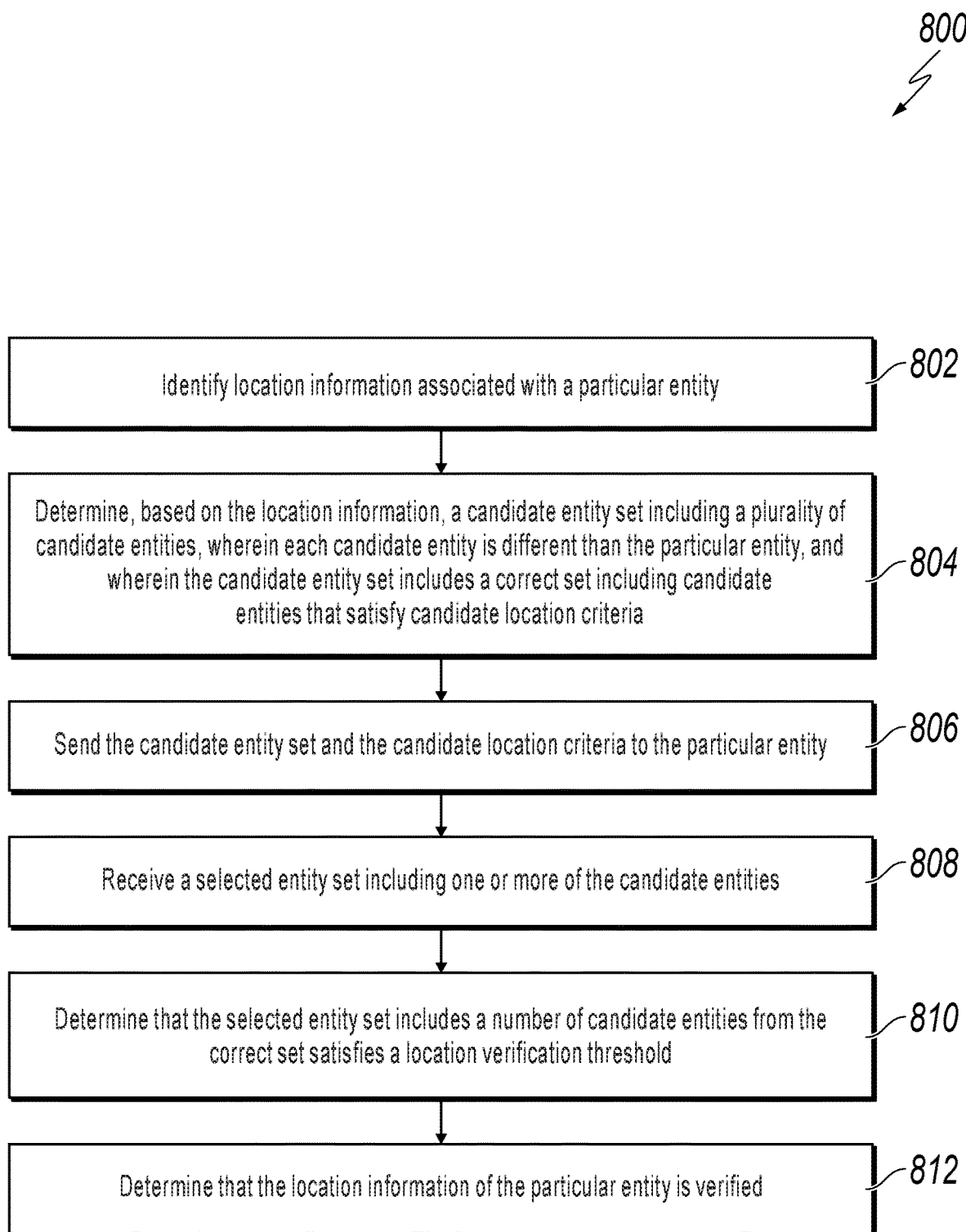
FIG. 8 is a flowchart illustrating an example of a computer-implemented method for verifying location information of a particular entity, according to an implementation of the present disclosure.

FIG. 8 is a flowchart illustrating an example of a computer-implemented method 800 for verifying location information of a particular entity, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, location information associated with a particular entity is identified. At 804, a candidate entity set including a plurality of candidate entities is determined based on the location information, wherein each candidate entity is different than the particular entity, and wherein the candidate entity set includes a correct set including candidate entities that satisfy candidate location criteria. In some cases, the candidate location criteria includes a proximity condition. In some implementations, the proximity condition specifies an area surrounding a location specified by the location information, and a candidate entity satisfies the proximity condition if its location is within the area. In some cases, the candidate location criteria includes a non-proximity condition. In some examples, the non-proximity condition specifies an area surrounding a location specified by the location information, and a candidate entity satisfies the non-proximity condition if its location is outside the area. In some cases, the candidate entity set includes, for each candidate entity, at least one of name information of the candidate entity, real scene images of the candidate entity, or trademark information of the candidate entity.

At 806, the candidate entity set and the candidate location criteria are sent to the particular entity. At 808, a selected entity set including one or more of the candidate entities is received. At 810, a determination is made that the selected entity set includes a number of candidate entities from the correct set satisfies a location verification threshold.

At 812, in response determining that the selected entity set includes the number of candidate entities from the correct set that exceeds the location verification threshold, a determination is made that the location information of the particular entity is verified. In some cases, the location verification threshold includes a percentage of the correct set. In some examples, determining that the location information of the particular entity is verified includes determining that the particular entity is associated with a physical location matching the location information.

In some cases, the particular entity is a first entity, the candidate entity set is a first candidate entity set, the correct set is a first correct set, the selected entity set is a first selected entity set, and the method further comprises identifying location information associated with a second entity; determining, based on the location information, a second candidate entity set including a second correct set including candidate entities that satisfy the candidate location criteria; sending the second candidate entity set and the candidate location criteria to the second entity; receiving a second selected entity set including one or more of the candidate entities; and determining that the second selected entity set includes a number of candidate entities from the correct set that does not satisfy the location verification threshold; and in response determining that the second selected entity set includes the number of candidate entities from the correct set that does not satisfy the location verification threshold, determining that the location information of the particular entity is not verified.

The techniques described herein produce one or more technical effects. For example, the techniques can enable a service provider to verify whether a particular entity using the service is located at a physical location specified by the particular entity. This verification can enable the provider to prevent entities from providing fraudulent location information in order to use the service without being located at a physical location. This can provide additional security for the service provider against misuse or fraudulent use of the service. In another example, the techniques can determine whether a human is providing the location information associated with the entity, as a computer will generally perform poorly on tasks involving identifying locations meeting a particular criteria from images.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for verifying location information of a particular entity, the computer-implemented method comprising:
   identifying location information associated with a particular entity;
   determining, based on the location information, a candidate entity set including a plurality of candidate entities, wherein each candidate entity is different than the particular entity, and wherein the candidate entity set includes a correct set including candidate entities that satisfy candidate location criteria;
   sending the candidate entity set and the candidate location criteria to the particular entity;
   receiving a selected entity set including one or more of the candidate entities;
   determining that the selected entity set includes a number of candidate entities from the correct set satisfies a location verification threshold; and
   in response determining that the selected entity set includes the number of candidate entities from the correct set that exceeds the location verification threshold, determining that the location information of the particular entity is verified.

2. The computer-implemented method of claim 1, wherein the particular entity is a first entity, the candidate entity set is a first candidate entity set, the correct set is a first correct set, the selected entity set is a first selected entity set, and the method further comprising:
   identifying location information associated with a second entity;
   determining, based on the location information, a second candidate entity set including a second correct set including candidate entities that satisfy the candidate location criteria;
   sending the second candidate entity set and the candidate location criteria to the second entity;
   receiving a second selected entity set including one or more of the candidate entities;
   determining that the second selected entity set includes a number of candidate entities from the correct set that does not satisfy the location verification threshold; and
   in response determining that the second selected entity set includes the number of candidate entities from the correct set that does not satisfy the location verification threshold, determining that the location information of the particular entity is not verified.

3. The computer-implemented method of claim 1, wherein the candidate location criteria includes a proximity condition.

4. The computer-implemented method of claim 3, wherein the proximity condition specifies an area surrounding a location specified by the location information, and a candidate entity satisfies the proximity condition if its location is within the area.

5. The computer-implemented method of claim 1, wherein the candidate location criteria includes a non-proximity condition.

6. The computer-implemented method of claim 5, wherein the non-proximity condition specifies an area surrounding a location specified by the location information, and a candidate entity satisfies the non-proximity condition if its location is outside the area.

7. The computer-implemented method of claim 1, wherein the candidate entity set includes, for each candidate entity, at least one of name information of the candidate entity, real scene images of the candidate entity, or trademark information of the candidate entity.

8. The computer-implemented method of claim 1, wherein the location verification threshold includes a percentage of the correct set.

9. The computer-implemented method of claim 1, wherein determining that the location information of the particular entity is verified includes determining that the particular entity is associated with a physical location matching the location information.

10. A non-transitory, computer-readable medium storing one or more instructions executable by a computer system to perform operations comprising:

identifying location information associated with a particular entity;

determining, based on the location information, a candidate entity set including a plurality of candidate entities, wherein each candidate entity is different than the particular entity, and wherein the candidate entity set includes a correct set including candidate entities that satisfy candidate location criteria;

sending the candidate entity set and the candidate location criteria to the particular entity;

receiving a selected entity set including one or more of the candidate entities;

determining that the selected entity set includes a number of candidate entities from the correct set satisfies a location verification threshold; and in response determining that the selected entity set includes the number of candidate entities from the correct set that exceeds the location verification threshold, determining that the location information of the particular entity is verified.

11. The non-transitory, computer-readable medium of claim 10, wherein the particular entity is a first entity, the candidate entity set is a first candidate entity set, the correct set is a first correct set, the selected entity set is a first selected entity set, and the operations further comprising:

identifying location information associated with a second entity;

determining, based on the location information, a second candidate entity set including a second correct set including candidate entities that satisfy the candidate location criteria;

sending the second candidate entity set and the candidate location criteria to the second entity;

receiving a second selected entity set including one or more of the candidate entities; and determining that the second selected entity set includes a number of candidate entities from the correct set that does not satisfy the location verification threshold; and in response determining that the second selected entity set includes the number of candidate entities from the correct set that does not satisfy the location verification threshold, determining that the location information of the particular entity is not verified.

12. The non-transitory, computer-readable medium of claim 10, wherein the candidate location criteria includes a proximity condition.

13. The non-transitory, computer-readable medium of claim 12, wherein the proximity condition specifies an area surrounding a location specified by the location information, and a candidate entity satisfies the proximity condition if its location is within the area.

14. The non-transitory, computer-readable medium of claim 10, wherein the candidate location criteria includes a non-proximity condition.

15. The non-transitory, computer-readable medium of claim 14, wherein the non-proximity condition specifies an area surrounding a location specified by the location information, and a candidate entity satisfies the non-proximity condition if its location is outside the area.

16. The non-transitory, computer-readable medium of claim 10, wherein the candidate entity set includes, for each candidate entity, at least one of name information of the candidate entity, real scene images of the candidate entity, or trademark information of the candidate entity.

17. The non-transitory, computer-readable medium of claim 10, wherein the location verification threshold includes a percentage of the correct set.

18. The non-transitory, computer-readable medium of claim 10, wherein determining that the location information of the particular entity is verified includes determining that the particular entity is associated with a physical location matching the location information.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying location information associated with a particular entity;

determining, based on the location information, a candidate entity set including a plurality of candidate entities, wherein each candidate entity is different than the particular entity, and wherein the candidate entity set includes a correct set including candidate entities that satisfy candidate location criteria;

sending the candidate entity set and the candidate location criteria to the particular entity;

receiving a selected entity set including one or more of the candidate entities;

determining that the selected entity set includes a number of candidate entities from the correct set satisfies a location verification threshold; and in response determining that the selected entity set includes the number of candidate entities from the correct set that exceeds the location verification threshold, determining that the location information of the particular entity is verified.

20. The computer-implemented system of claim 19, wherein the particular entity is a first entity, the candidate entity set is a first candidate entity set, the correct set is a first correct set, the selected entity set is a first selected entity set, and the operations further comprising:

identifying location information associated with a second entity;

determining, based on the location information, a second candidate entity set including a second correct set including candidate entities that satisfy the candidate location criteria;

sending the second candidate entity set and the candidate location criteria to the second entity;

receiving a second selected entity set including one or more of the candidate entities; and determining that the second selected entity set includes a number of candidate entities from the correct set that does not satisfy the location verification threshold; and in response determining that the second selected entity set includes the number of candidate entities from the correct set that does not satisfy the location verification threshold, determining that the location information of the particular entity is not verified.

* * * * *